US006380704B1

(12) United States Patent
Chin

(10) Patent No.: US 6,380,704 B1
(45) Date of Patent: Apr. 30, 2002

(54) FAN LINEAR SPEED CONTROLLER

(75) Inventor: Shu-Yuan Chin, Hsin-Chu (TW)

(73) Assignee: Silicon Touch Technology Inc., Hsin-Chun (TW)

( * ) Notice: Subject to any disclaimer, the term of this patent is extended or adjusted under 35 U.S.C. 154(b) by 0 days.

(21) Appl. No.: 09/307,906

(22) Filed: May 10, 1999

(51) Int. Cl.$^7$ ............................................... H02P 7/285
(52) U.S. Cl. ...................... 318/268; 318/434; 318/471
(58) Field of Search ................... 318/434, 459, 318/471, 268; 388/934, 908, 903

(56) References Cited

U.S. PATENT DOCUMENTS

| 4,124,001 | A | * | 11/1978 | Samuel et al. | |
| 4,552,205 | A | * | 11/1985 | Saunders | |
| 5,790,430 | A | * | 8/1998 | Steiert | |
| 6,040,668 | A | * | 3/2000 | Huynh et al. | 318/471 |
| 6,188,189 | B1 | * | 2/2001 | Blake | 318/471 |

OTHER PUBLICATIONS

Nillson et al, "Electric Circuits", Fifth Edition, Addison–Wesley Publishing Company, 1996. Pp. 179–180.*

* cited by examiner

Primary Examiner—Bentsu Ro
(74) Attorney, Agent, or Firm—William E. Pelton, Esq.

(57) ABSTRACT

A fan linear speed controller is disclosed, which controls the rotation speed of a fan by an external fan control voltage. The fan linear speed controller includes a temperature sensor unit, a linear speed control unit and a fault detection unit. The temperature sensor unit has a thermistor for detecting the ambient temperature of the fan to generate a thermally sensitive voltage. The linear speed control unit receives the external fan control voltage and the thermally sensitive voltage to generate an output voltage for driving the fan. The output voltage is proportional to the fan control voltage when the thermally sensitive voltage is lower than a preset threshold voltage and the fan control voltage is higher than a preset reference voltage. The fault detection unit receives the thermally sensitive voltage and a rotation speed signal generated by the fan to selectively produce a fault signal indicating that the rotation of the fan is abnormal or the ambient temperature of the fan is too high.

5 Claims, 3 Drawing Sheets

FAN LINEAR SPEED CONTROLLER

BACKGROUND OF THE INVENTION

1. Field of the Invention

The present invention relates to a fan speed controller, more particularly, to a fan speed controller that uses an external fan voltage to control the speed of a fan in such a manner that the speed of the fan is linearly related to the external fan voltage.

2. Description of Related Art

Heat-dissipation management for PCs (personal computers) and related products has become a popular topic as the size of the PC and other electronic appliances gets smaller and the electronic elements get more powerful so that the heat generated by the electronic elements in the PC has to be removed efficiently. U.S. Pat. No. 5,526,289 granted to Dinh et al. disclosed a temperature dependent fan control circuit for a PC that controls the rotation of a fan such that the speed of the fan is adjusted based on the temperature within the PC housing. This conventional fan control circuit uses a thermistor to sense the ambient temperature in the PC housing whereby the speed of the fan is controlled in a linear relationship to the ambient temperature. That is, when the ambient temperature is high, the speed of the fan is also high. On the contrary, when the ambient temperature is low, the speed of the fan is also low. Therefore, the fan is maintained at the lowest possible speed for effective heat dissipation so that the power consumption is reduced and the noise generated by the fan rotation is decreased. However, with such a conventional fan control circuit, the speed of the fan is only a function of the ambient temperature in the PC housing. Sometimes, the ambient temperature does not actually reflect the abnormal operational conditions of the PC such that the fan is locked or the fan is improperly controlled. Therefore, there is a need for the above fan control circuit to be improved.

SUMMARY OF THE INVENTION

The objective of the present invention is to provide a fan linear speed controller that controls the speed of a fan relative to an external fan voltage and further provides a fault signal to indicate the abnormal operational conditions of the fan.

To achieve this objective, the fan linear speed controller in accordance with the present invention includes a temperature sensor unit, a linear speed control unit and a fault detection unit. The temperature sensor unit has a thermistor for detecting the ambient temperature of the fan to generate a thermally sensitive voltage. The linear speed control unit receives an external fan control voltage and the thermally sensitive voltage to generate an output voltage to drive the fan, wherein the output voltage is proportional to the fan control voltage when the thermally sensitive voltage is lower than a preset threshold voltage and the fan control voltage is higher than a preset reference voltage. The fault detection unit receives the thermally sensitive voltage and a rotation speed signal generated by the fan to selectively produce a fault signal indicating that the rotation of the fan is abnormal or the ambient temperature of the fan is too high.

Other objectives, advantages, and novel features of the invention will become more apparent from the following detailed description when taken in conjunction with the accompanying drawings.

DETAILED DESCRIPTION OF THE PREFERRED EMBODIMENT

Figure 1:
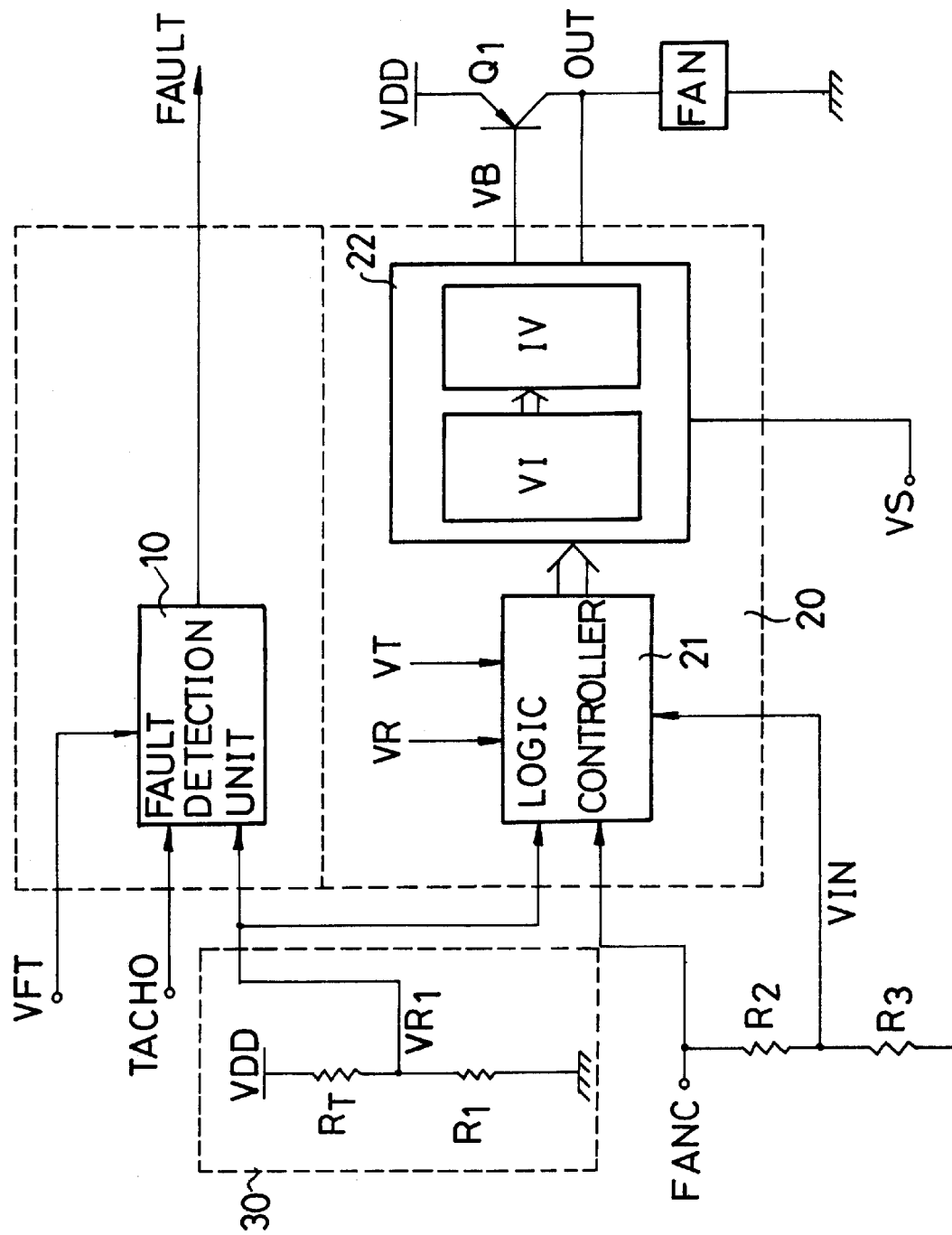
FIG. 1 is a circuit block diagram of a fan linear speed controller in accordance with the present invention.

FIG. 1 shows the circuit block diagram of a fan linear speed controller in accordance with the present invention. The fan linear speed controller includes a fault detection unit (10) and a linear speed control unit (20) which drives a fan via a transistor Q1.

The fault detection unit (10) receives a tacho signal from the fan and a thermally sensitive voltage (VR1) from a temperature sensor unit (30). The tacho signal is a conventional pulse signal generated by a fan when rotating to represent the fan rotation speed. The temperature sensor unit (30) is provided to detect the ambient temperature in the area of the fan to generate the thermally sensitive voltage whose value is proportional to the detected ambient temperature. By monitoring the frequency of the tacho signal and the thermally sensitive voltage, the fault detection unit (10) can detect that the fan is rotating abnormally or even locked, or that the operational temperature of the fan is too high, thereby generating a fault signal to activate an audible, visual or digital alarm.

The temperature sensor unit (30) has a thermistor (RT) connected in series with a resistor (R1). The thermistor (RT) is a negative coefficient type so that the thermally sensitive voltage (VR1) obtained at the connection point of the two resistors RT and R1 is proportional to the ambient temperature. In detail, when the ambient temperature arises, the resistance of the thermistor (RT) decreases so that the thermally sensitive voltage (VR1) across the resistor R1 is relatively high. On the contrary, when the ambient temperature goes down, the resistance of the thermistor (RT) increases so that the thermally sensitive voltage (VR1) across the resistor R1 is relatively low. Therefore, the thermally sensitive voltage (VR1) is proportional to the ambient temperature of the fan.

The linear speed control unit (20) includes a logic controller (21) and a voltage level shifter (22). The logic controller (21) is provided to determine the operational mode of the fan. The logic controller (21) has five inputs for receiving the thermally sensitive voltage (VR1), an external fan control voltage (FANC), a reference voltage (VR), a threshold voltage (VT) and an input voltage (VIN) which is a preset portion of the fan control voltage (FANC). To obtain the input voltage (VIN), two resistors R2 and R3 are connected in series between the fan control voltage (FANC) and ground so that a portion of the fan control voltage (FANC) is present at the connection point of the two resistors R2 and R3, which is applied to the logic controller (21) as the input voltage (VIN).

The logic controller (21) is provided to selectively supply the input voltage (VIN) to drive the fan via the voltage level shifter (22) to operate in such a manner that the rotation speed of the fan is linearly related to the external fan control voltage (FANC) when the fan control voltage (FANC) is larger than the reference voltage. That is, when the fan control voltage (FANC) increases, the rotation speed of the fan is high, and when the fan control voltage (FANC) decreases, the rotation speed of the fan is low.

Furthermore, it is possible that the ambient temperature may abruptly increase because the control to the fan by the fan control voltage (FANC) is improper. The logic controller

(21) can recognize such a condition by detecting whether the thermally sensitive voltage is higher than the threshold voltage (VT). When such a condition is encountered, the logic controller (21) no longer drives the fan to rotate at a speed linearly related to the fan control voltage (FANC) but to rotate at full speed until the thermally sensitive voltage (VR1) is much lower than the threshold voltage (VT).

The voltage level shifter (22) has a voltage to current converter (VI) and a current to voltage converter (IV). The voltage to current converter (VI) transforms the input voltage (VIN) supplied by the logic controller (21) to a current and the current to voltage converter (IV) further transforms the current to a desired voltage VB for application to the base of transistor Q1 thereby generating a output voltage (OUT) at its collector to drive the fan. In this preferred embodiment, transistor Q1 is implemented with a PNP transistor. However, transistor Q1 can also be implemented with other types of transistors such as an NPN transistor, NMOS transistor or PMOS transistor.

Figure 2:
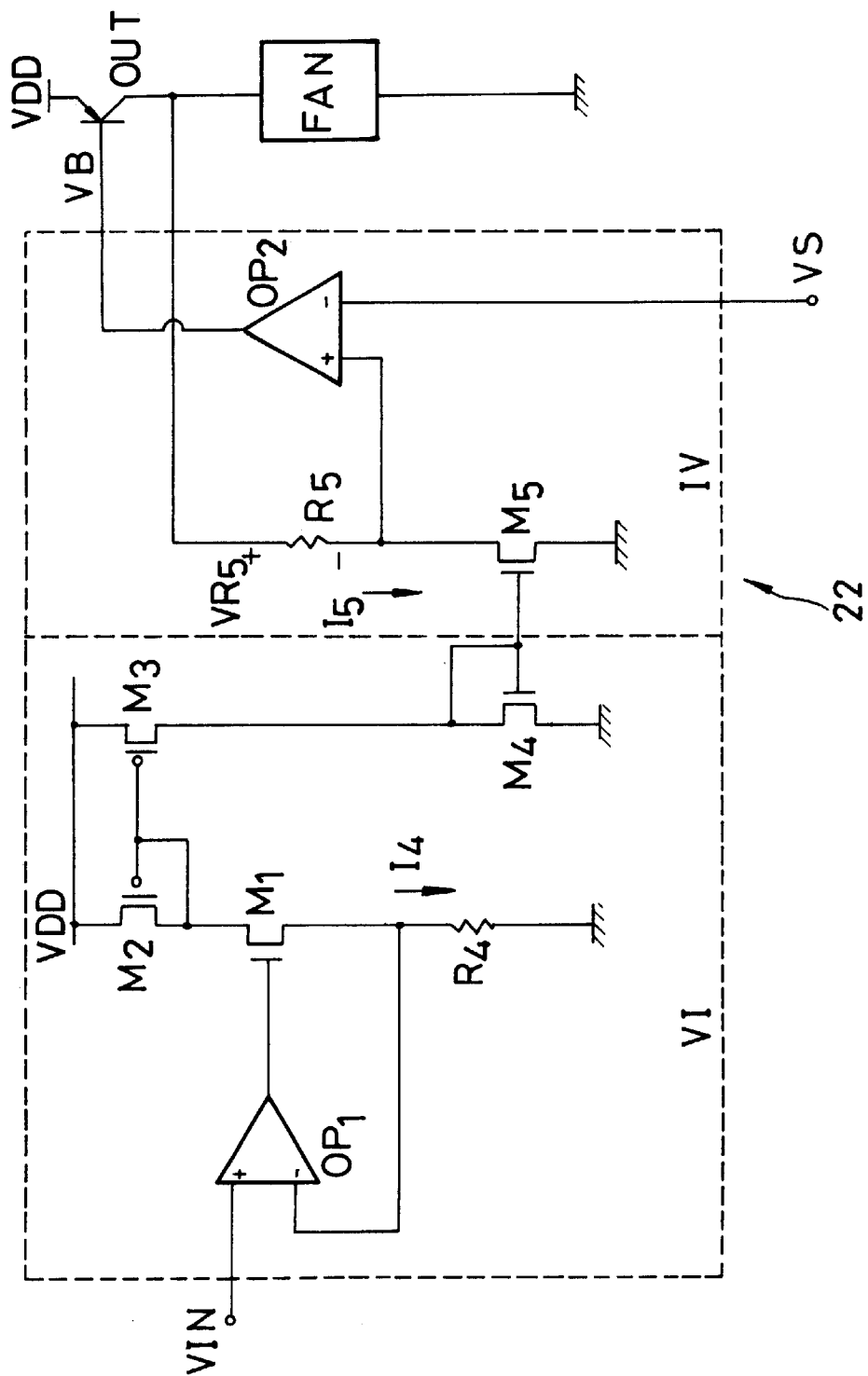
FIG. 2 is a detailed circuit diagram of the voltage level shifter shown in FIG. 1.

FIG. 2 shows the circuit diagram of the voltage level shifter (22). The voltage to current converter (VI) includes an operational amplifier (OP1), four transistors M1~M4 and a resistor R4. The positive input of the operational amplifier (OP1) is provided to receive the input voltage (VIN) while the negative input thereof is connected to the resistor R4 and transistor M1. The output of the operational amplifier (OP1) is connected to the base of the transistor M1. Further, the transistors M2 and M3 are provided to form a current mirror.

The current to voltage converter (IV) includes a transistor M5, a resistor R5 and an operational amplifier OP2. Transistor M5 and transistor M4 of the voltage to current converter (VI) are connected to form a current mirror. The positive input of the operational amplifier OP2 is connected to the resistor R5 and the drain of the transistor M5 while the negative input thereof is connected to a start reference voltage VS. The output of the operational amplifier OP2 is connected to the transistor Q1 to drive the fan. With the voltage level shifter (22), the input voltage (VIN) from the logic controller (21) is applied to the operational amplifier OP1 via the positive input thereof. The output of the operational amplifier OP1 then produces a corresponding voltage which is converted to a current $I_4$ by transistors M1 and M2 and resistor R4. Further, because of the current mirrors formed by the transistors M2, M3, M4 and M5, current $I_5$ that flows through the resistor R5 is proportional to $I_4$. Therefore, the output voltage OUT is equal to the voltage drop VR5 over the transistor R5 plus the start reference voltage. VS, which can be mathematically expressed as OUT=VR5+VS. Because $I_5$ is proportional to $I_4$, and $I_4$ is equal to VIN/R4, output voltage OUT can be expressed as:

$$OUT = VR5 + VS = I_5 \times R5 + VS = K1 \times (VIN/R4) \times R5 + VS = K \times VIN + VS,$$

wherein K and K1 are constants, the value of K1 being determined by the ratios of the current mirrors formed by transistors M2~M5. That is:

$$K1 = (M3/M2) \times (M5/M4) \text{ and } K = K1 \times (R5/R4).$$

Therefore, the output voltage (OUT) is obtained, which is linearly related to the input voltage (VIN) and has an offset equal to the start reference voltage (VS).

Accordingly, when the fan control voltage (FANC) increases, the output voltage also increases and the rotation speed of the fan is faster. However, when the fan control voltage (FANC) decreases, the output voltage also decreases and the rotation speed of the fan is slower. Therefore, the rotation speed of the fan can be controlled by the external fan control voltage (FANC).

Figure 3:
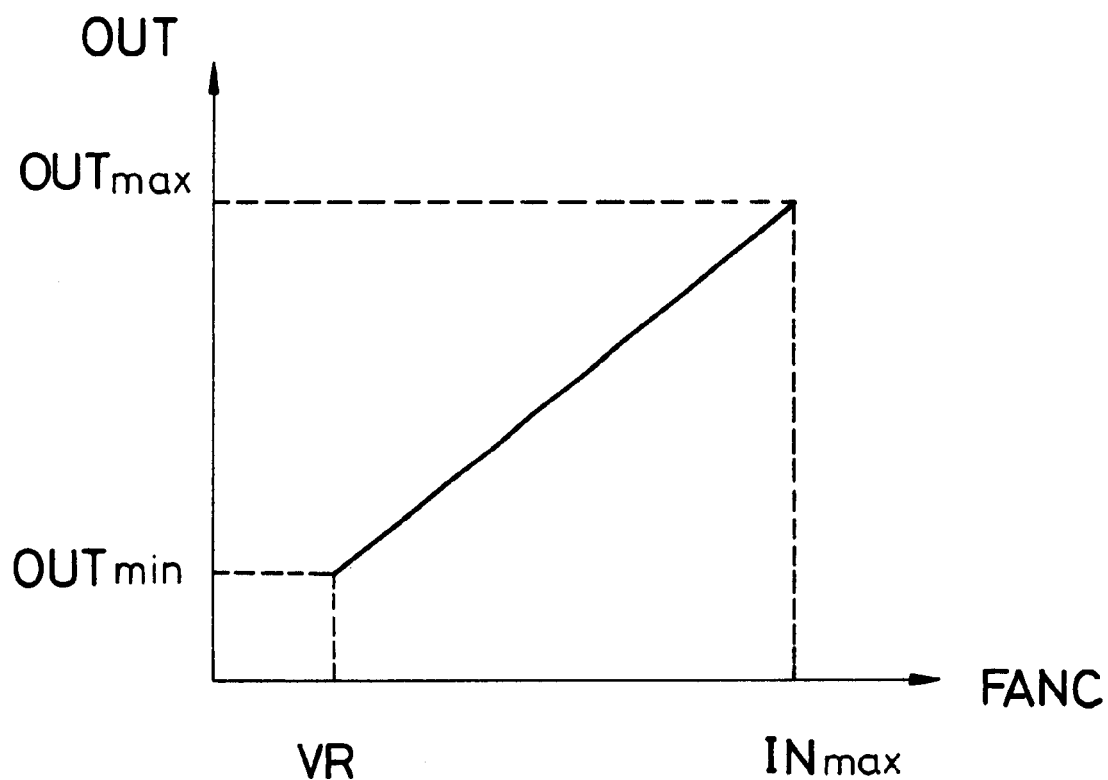
FIG. 3 shows the linear relationship between the external fan control voltage and the output voltage shown in FIG. 1.

With reference to FIG. 3, the relationship between the external fan control voltage (FANC) and the output voltage (OUT) is shown. When the fan control voltage (FANC) is lower than the reference voltage (VR), the output voltage (OUT) is zero and the fan is off. When the fan control voltage (FANC) is higher than the reference voltage (VR) but lower than a maximum input voltage ($IN_{max}$), the output voltage (OUT) is linearly related to the fan control voltage (FANC). The upper and lower bound of the linear-varied output voltage (OUT) are $OUT_{max}$ and $OUT_{min}$, respectively. In other words, when the input voltage (VIN) increases, the output voltage (OUT) also increases. When the input voltage (VIN) is over $VIN_{max}$, the output voltage (OUT) is maintained at $OUT_{max}$. As seen in the above description, there are two fan operational modes provided by the fan linear speed controller in accordance with the present invention. In the first operational mode, the rotation of the fan is controlled by the external fan control voltage (FANC). In the second operational mode, the rotation of the fan is controlled by the ambient temperature detected by the temperature sensor unit (30). The switching operation between the two operational modes is determined by the logic controller (21) of the linear speed control unit (20). Normally, the fan operates in the first operational mode so that the rotation speed of the fan is controlled by the external fan control voltage (FANC) provided from a device or system that has its heat dissipated by the fan. Therefore, the rotation speed of the fan is dynamically adjusted based on the actual condition of the device or system thereby promoting the heat-dissipation efficiency, avoiding unnecessary power wastage and decreasing the noise generated by the fan rotation.

However, if the control to the fan by the fan control voltage (FANC) is improper so that the ambient temperature is too high, the fan is switched to operate in the second operational mode in which the fan is rotated at full speed until the ambient temperature is greatly reduced.

In addition, the fan linear speed controller in accordance with the present invention is provided with a fault detection function. The fan linear speed controller monitors the rotation speed of the fan and the ambient temperature so that a fault signal is generated when the fan is locked or the ambient temperature is too high whereby a user can respond to such an abnormal condition.

Although the present invention has been explained in relation to its preferred embodiment, it is to be understood that many other possible modifications and variations can be made without departing from the spirit and scope of the invention as hereinafter claimed.

What is claimed is:

1. A fan linear speed controller for controlling the rotation speed of a fan by an external fan control voltage (FANC), comprising:
   a temperature sensor unit having a thermistor for detecting the ambient temperature around said fan to generate a thermally sensitive voltage (VRI);
   a linear speed control unit for receiving said fan control voltage (FANC) and said thermally sensitive voltage (VRI) to generate an output voltage (OUT) for applying to said fan, wherein said output voltage (OUT) is proportional to said fan control voltage (FANC) when said thermally sensitive voltage (VRI) is lower than a preset threshold voltage (VT) and said fan control voltage (FANC) is higher than a preset reference voltage (VR), wherein the linear speed control unit comprises:

a logic controller for receiving said fan control voltage (FANC), said thermally sensitive voltage (VR1), said reference voltage (VR), said threshold voltage (VT) and an input voltage (VIN) that is a preset portion of said fan control voltage (FANC) for selectively supplying said input voltage (VIN); and a voltage level shifter connected to said logic controller for receiving said input voltage (VIN) from said logic controller and transforming said received input voltage (VIN) to said output voltage (OUT) to drive said fan.

2. The fan linear speed controller as claimed in claim 1 further comprising a fault detection unit for receiving said thermally sensitive voltage and a rotation speed signal generated by said fan to selectively produce a fault signal indicating that the rotation of said fan is abnormal or the ambient temperature of said fan is higher than a preset value.

3. The fan linear speed controller as claimed in claim 1, said voltage level shifter comprising:

a voltage to current converter (VI) for transforming said input voltage (VIN) from said logic controller to a current; and a current to voltage converter (IV) for transforming said current to a voltage (VB) which is applied to a driving transistor (Q1) to generate said output voltage (OUT) to drive said fan.

4. The fan linear speed controller as claimed in claim 3, wherein said voltage to current converter (VI) includes an operational amplifier (OP1), first to fourth transistors (M1~M4) and a resistor (R4), said operational amplifier (OP1) having a positive input for receiving said input voltage (VIN), a negative input connected to said resistor R4 and the transistor M1, and an output connected to the base of said first transistor (M1), said second and third transistors (M2, M3) being provided to form a first current mirror.

5. The fan linear speed controller as claimed in claim 4, wherein said current to voltage converter (IV) includes a fifth transistor (M5), a resistor (R5) and an operational amplifier (OP2), said fifth transistor (M5) and said forth transistor (M4) being connected to form a second current mirror, said operational amplifier (OP2) having a positive input connected to said resistor (R5) and the drain of said fifth transistor (M5), a negative input connected to a start reference voltage (VS), and an output connected to said driving transistor (Q1) to drive the fan.

* * * * *